United States Patent
Marchok et al.

(10) Patent No.: US 6,526,140 B1
(45) Date of Patent: Feb. 25, 2003

(54) CONSOLIDATED VOICE ACTIVITY DETECTION AND NOISE ESTIMATION

(75) Inventors: Daniel J. Marchok, Buchanan, MI (US); Richard C. Younce, Wakarusa, IN (US); Charles W. K. Gritton, Sterling, VA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 09/706,303

(22) Filed: Nov. 3, 2000

Related U.S. Application Data
(60) Provisional application No. 60/163,359, filed on Nov. 3, 1999, and provisional application No. 60/224,398, filed on Aug. 10, 2000.

(51) Int. Cl.[7] .............................................. H04M 9/08
(52) U.S. Cl. ............................ 379/406.03; 379/406.01; 379/406.02; 379/86.04; 379/67; 379/201.03; 379/216; 379/88.07; 379/207; 379/214
(58) Field of Search ..................... 379/406.01, 406.16; 709/201, 220, 221, 229, 249, 278

(56) References Cited

U.S. PATENT DOCUMENTS

| | | | |
|---|---|---|---|
| 4,514,703 A | | 4/1985 | Maher et al. |
| 4,663,675 A | * | 5/1987 | Jones, Jr. et al. |
| 4,663,884 A | | 5/1987 | Zeischegg et al. |
| 5,241,543 A | | 8/1993 | Amada et al. |
| 5,307,405 A | | 4/1994 | Sih |
| 5,313,498 A | | 5/1994 | Sano |
| 5,394,460 A | * | 2/1995 | Olson et al. |
| 5,452,341 A | * | 9/1995 | Sattar |
| 5,561,668 A | | 10/1996 | Genter |
| 5,704,003 A | | 12/1997 | Kleijn et al. |
| 5,721,730 A | | 2/1998 | Genter |
| 5,764,763 A | * | 6/1998 | Jensen et al. |
| 5,796,439 A | | 8/1998 | Hewett et al. |
| 5,835,486 A | | 11/1998 | Davis et al. |

(List continued on next page.)

FOREIGN PATENT DOCUMENTS

WO    WO 9903093 A1    1/1999

OTHER PUBLICATIONS

Written Opinion regarding International Application No. PCT/US00/30298 dated Oct. 12, 2001.
Tellabs Echo Cancellation Tutorial, www.iec.org/tutorials/echo_cancel/index.html, Oct. 20, 2000.

(List continued on next page.)

*Primary Examiner*—Forester W. Isen
*Assistant Examiner*—Ramnandan Singh
(74) *Attorney, Agent, or Firm*—Banner & Witcoff, Ltd.

(57) ABSTRACT

Methods and apparatus for processing at least one voice signal in which a centralized voice processing unit controls operation of a plurality of voice processing block. In a first embodiment, the centralized voice processing unit comprises a centralized voice activity detector that provides at least one voice activity indication to the plurality of voice processing blocks. In a second embodiment, the centralized voice processing unit comprises a centralized noise estimator that provides at least one noise estimate to the plurality of voice processing blocks. In a third embodiment, the centralized voice processing unit comprises a centralized signal characteristic estimator that provides at least one signal characteristic estimate to the plurality of voice processing blocks.

36 Claims, 5 Drawing Sheets

U.S. PATENT DOCUMENTS

| | | |
|---|---|---|
| 5,857,167 A | 1/1999 | Gritton et al. |
| 5,884,255 A | 3/1999 | Cox |
| 5,912,966 A | 6/1999 | Ho |
| 5,920,834 A * | 7/1999 | Sih et al. |
| 5,999,828 A | 12/1999 | Sih et al. |
| 6,023,674 A | 2/2000 | Mekuria |
| 6,035,048 A * | 3/2000 | Diethorn |
| 6,040,860 A | 3/2000 | Tamura et al. |
| 6,084,881 A | 7/2000 | Fosmark et al. |
| 6,088,365 A | 7/2000 | Kurdzo et al. |
| 6,148,078 A * | 11/2000 | Romesburg |
| 6,151,576 A | 11/2000 | Warnock et al. |
| 6,160,886 A | 12/2000 | Romesburg et al. |
| 6,330,533 B2 * | 12/2001 | Su et al. |
| 6,351,731 B1 * | 2/2002 | Anderson et al. |

OTHER PUBLICATIONS

Konodoz et al. "A High Quality Voice Coder with Integrated Echo Canceller and Voice Detector for VSAT Systems", Satellites Communicatios–ECSC–3, 1993, $3^{rd}$ European Conference on , pp.: 196–200.

Little, Bernhard et al. "Speech Recognition for the Siemens EWSP Public Exchange", Interactive Voice Technology (IVT) for Telecommunications Applications, 1998. IVT Proceedings IEEE $4^{th}$ Workshop, 1998, pp. 175–178.

* cited by examiner

CONSOLIDATED VOICE ACTIVITY DETECTION AND NOISE ESTIMATION

CROSS-REFERENCE TO RELATED APPLICATIONS

The present application claims priority from U.S. Patent Application Ser. No. 60/163,359 entitled "INTEGRATED VOICE PROCESSING SYSTEM FOR COMMUNICATION NETWORKS" filed on Nov. 3, 1999 and of U.S. Patent Application Ser. No. 60/224,398 "NOISE INJECTING SYSTEM" filed on Aug. 10, 2000, both assigned to the same assignee of the present invention.

The teachings of U.S. Pat. Nos. 5,721,730; 5,884,255; 5,561,668; 5,857,167 and 5,912,966 are hereby incorporated by reference.

TECHNICAL FIELD

The present invention is principally related to voice processing systems and, in particular, to a next generation voice processing system (NGVPS) designed specifically for voice-over-x systems and a wider class of voice processing applications.

BACKGROUND OF THE INVENTION

Voice quality is critical to the success of voice-over-x (e.g., Voice-Over-IP) systems, which has led to complex, digital signal processor (DSP) intensive, voice processing solutions. For the so-called new public network to be successful in large-scale voice deployment, it must meet or exceed the voice quality standards set by today's time division multiplex (TDM) network. These systems require a combination of virtually all known single source voice processing algorithms, which include but are not limited to the following: echo cancellation, adaptive level control, noise reduction, voice encoders and decoders (or codecs), acoustic coupling elimination and non-linear processing, voice activity detectors, double talk detection, signaling detection-relay-and-regeneration, silence suppression, discontinuous transmission, comfort noise generation and noise substitution, lost packet substitution/reconstruction, and buffer and jitter control. The current generation of voice solutions for packet networks has addressed this complex need by obtaining and plugging together separate voice sub-systems. Suppliers of these systems have concentrated their efforts in obtaining and creating each of the various blocks and making the blocks work together from an input-output perspective. During the integration process each of the functions have effectively been treated as black boxes. As a result, the sub-systems have been optimized only with regard to their function and not with respect to the complete system. This has lead to an overall sub-optimal design. The resulting systems have a reduced voice quality and require more processing power than an integrated approach, which has been optimized from a system perspective.

FIG. 1 shows a typical "black box" block diagram. The following abbreviations are used in FIG. 1: NR: noise reduction; ALC: automatic level control; ENC: speech encoder; FE: far end speaker; EC: echo canceller; SS: silence suppressor; NS: noise substitution; DEC: speech decoder; and NE: near end speaker. As shown, a transmitted voice signal 102 is processed by the echo canceller, and the pulse code modulated (PCM) output of the canceller is simply forwarded to the optional noise reduction unit, and then onto the auto level control unit, and then onto the codec, etc. A similar path is provided for received voice signals 104.

The problem with this method of simply plugging together DSP boxes is that it does not take into account the interactions of the elements within the boxes. FIG. 2 shows some of the individual elements within the subsystems in the voice-over-x DSP system of FIG. 1. A feel for the problem can be attained by some examples; a couple of the subsystem elements that can lead to sub-optimal voice quality are examined here.

In typical fashion, a non-linear processor (NLP) is included within the echo cancellation block. The NLP is a post-processor that eliminates the small amount of residual echo that is always present after the linear subtraction of the echo estimate. One artifact of the NLP is that it can distort background noise signals. Also shown in FIG. 2 are some of the components inside the noise reduction (NR) block. The NR sub-system must generate a background noise estimate. If the NR block is not aware of the distortion introduced by the NLP, it will improperly identify the background noise resulting in lower performance. As also known in the art, there is a background noise estimate function within the speech coder subsystem. This estimate is sent to the far end voice-over-x system when the near end speaker is silent. Both the NLP and the NR block would also adversely affect this noise estimate if their actions were not taken into account.

Another interaction problem can occur with the voice activity detectors (VAD) shown in FIG. 2. The goal of the VAD is to accurately detect the presence of either NE or FE speech. If speech is present, then the associated processing of the ALC, NR, or speech coder is performed. The echo canceller's double talk detector (DTD) is another form of VAD. It must detect both NE and FE speech and control the canceller so that it only adapts when NE speech is absent. Interaction between the elements such as the NLP, NR, or changes in the ALC can negatively affect the accuracy of the downstream VAD. For example, losses in the NLP or NR subsystems may falsely trigger the speech encoder to misinterpret voice as silence. This would cause the codec to clip the NE speech, which would degrade voice quality. Similar issues exist with regard to the VAD in the ALC block.

Thus, a need exists for an improved voice processing system that does not suffer from the interactive shortcomings of prior art solutions.

SUMMARY OF THE INVENTION

The present invention provides a next-generation voice processing system (NGVPS) designed with the overall system in mind. Each voice-processing block has been opened up revealing common functions and inter-block dependencies. By opening up these blocks, the NGVPS also enhances the functionality of some functions by using processing and signals that were previously only available to a single block. By taking into account the interaction of these various sub-systems and elements, the NGVPS provides the best overall voice performance. This holistic approach provides new means for optimizing voice processing from an end-to-end systems approach. This will be an important factor in the success of the new network.

A more system-wide optimization approach is described herein. This approach takes into account the interaction of the various sub-systems and elements to provide the best overall voice performance. For the so-called new public network to be successful in large-scale voice deployment, it must meet and should exceed the voice quality standards set by today's TDM network. Therefore, optimizing voice processing from an end-to-end systems approach is a critical success factor in new network design.

The system-wide, integrated voice processing approach of the present invention also creates opportunities for further enhancements by reordering of the sub-blocks, which make up the various blocks. For example, work has been conducted in the past on sub-band NLPs for echo cancellers. However, the significant processing required to create the sub-bands has typically been an over-riding factor with respect to the performance improvements. However, a NR system typically divides the signal into sub-bands in order to perform its operations. Opening up these blocks facilitates a system in which the EC's NLP can be moved to the sub-band part of the NR system. Thus, the performance improvement may be gained with very little additional processing.

The new public network concept, which is based on packet voice, requires this type of processing at each point of entry and departure from the network. Establishing a more integrated system, having the best performing processing elements at these points, is one of the objectives of the present invention. The present invention may be applicable to voice band enhancement products or voice-over-x products. Additional applications that could benefit from the present invention include any other products carrying-out voice processing.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE INVENTION

1. An Integrated Approach

Higher levels of voice quality can be achieved if the interactions of the elements within the boxes are considered and an integrated design approach is taken. The NGVPS system in effect opens these blocks, combining and enhancing common functions. This approach also eliminates inter-block dependencies. As a result of taking into account the interaction of these various sub-systems and elements, the NGVPS provides improved voice performance with less processing. In addition to improving common functions, the NGVPS enhances overall functionality by using processing and signals that were previously only available within a single block for multiple functions.

2. A Consolidated Multifunction Voice Activity Detector

Figure 3:
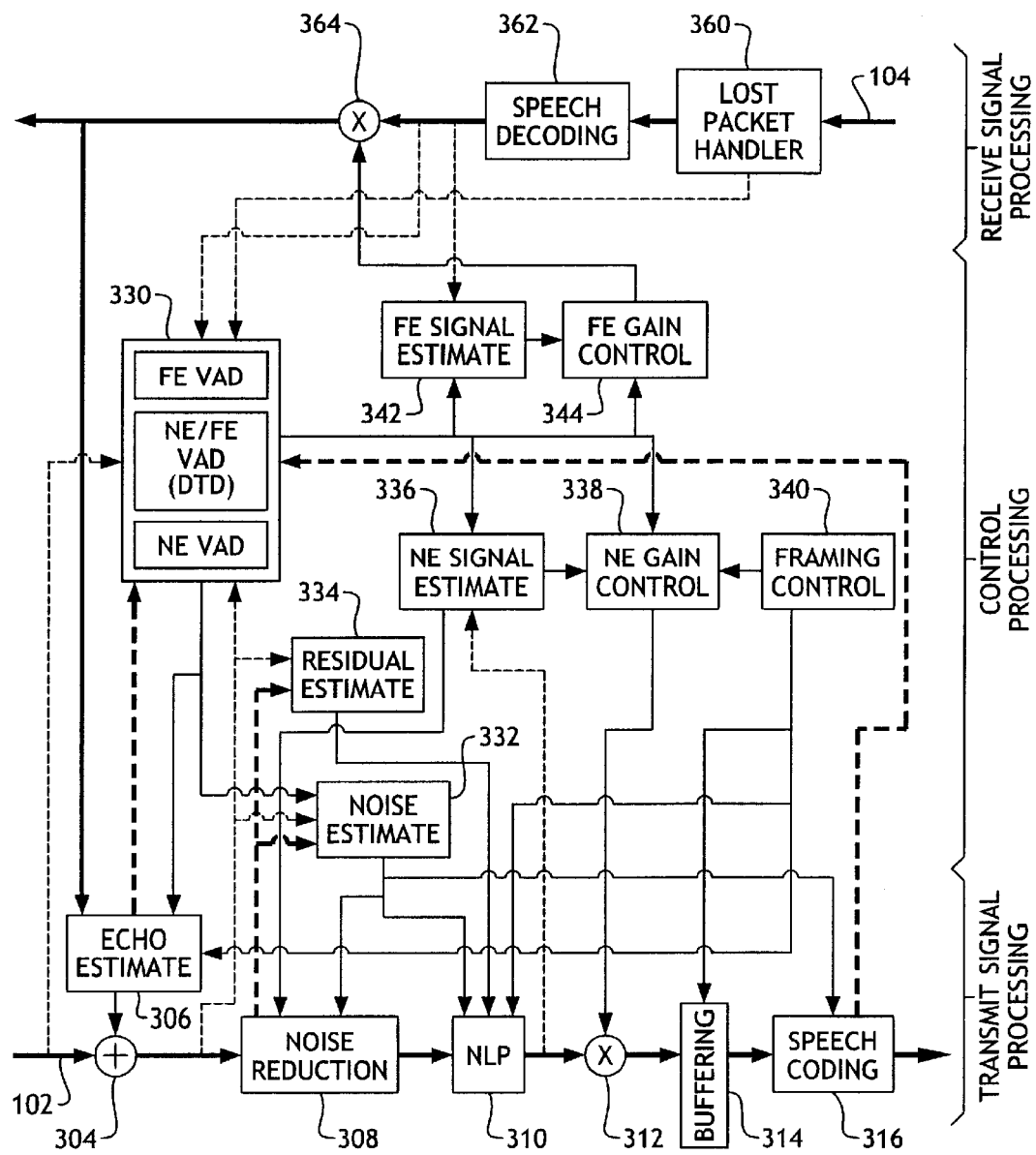
FIG. 3 is a block diagram of a voice processing system in accordance with the present invention.

A block diagram of an integrated voice-over-x DSP system in accordance with the present invention is shown in FIG. 3. As those having ordinary skill in the art will recognize, various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above. Note that there are a variety of signal types illustrated in FIG. 3. Speech signals (preferably in digital form) are represented by heavy solid lines; signal estimates, representative of various qualities of the voice signals, are illustrated using dashed lines; control signals are illustrated using solid lines; and algorithmic parameters, representative of internal values calculated by the various voice processing blocks, are illustrated using heavy dashed lines.

Transmitted voice signals 102 are provided to an echo canceller having an adder 304 and echo estimator 306. The resulting signals are then passed to a noise reduction circuit 308 and a non-linear processor 310. Collectively, the echo canceller, noise reduction circuit 308 and NLP 310 form an integrated echo and noise reduction section. The output of the NLP 310 is sent to an ALC 312 and then to buffering 314 and a speech encoder 316. It should be noted that a centralized buffer (not shown) is preferred over separate buffers associated with particular voice processing blocks (e.g., the buffering 314 associated with the speech encoder 316). In this manner, the various voice processing operations may be sequentially performed on audio data stored in the buffer. However, the centralized buffer has not been illustrated in FIG. 3 for the sake of simplicity. Similarly, the echo canceller functionality and the speech encoder 316 are preferably integrated, although they are shown as being separate in FIG. 3. The elements described above collectively form a transmit signal processing section of the overall integrated system, as shown in FIG. 3. Note that the term "circuitry" and its derivatives are used throughout this description as a means of describing various functional elements shown in the figures. However, use of this term should not be construed as a limitation to the manner in which such elements may be implemented, i.e., as hardware circuits.

The various blocks within the control processing section of the integrated system receive inputs from and provide outputs to the various blocks in the transmit signal processing section. Such signals are well known to those having ordinary skill in the art and, where necessary, are discussed below. Within the control processing section, a centralized voice activity detector 330 and a centralized noise estimator 332 are provided. As shown, these blocks are coupled to a residual estimator 334 (for assessing the amount of residual echo left in the transmit signal 102 after echo cancellation), a near end signal estimator 336, a near end gain controller 338 and a framing controller 340. As shown, the centralized noise estimator 332, the residual estimator 334, the near end signal estimator 336, the near end gain controller 338 and the framing controller 340 are associated with the transmit signal processing section. However, the control processing section also comprises a far end signal estimator 342 and a far end gain controller 344 associated with a receive signal processing section.

The receive signal processing section takes received audio signals 104 as input. A lost packet handler 360 is provided to mitigate the effects of lost packets on the received audio.

The speech decoder 362 converts the received audio signal from a parameterized or other representative form to a continuous speech stream. The received speech is then provided to an ALC 364. Note that the redundant blocks illustrated in FIG. 2 have been consolidated in the single control block in FIG. 3. Examples of consolidated and enhanced functions include the VADs and the background noise estimators.

Figure 1:
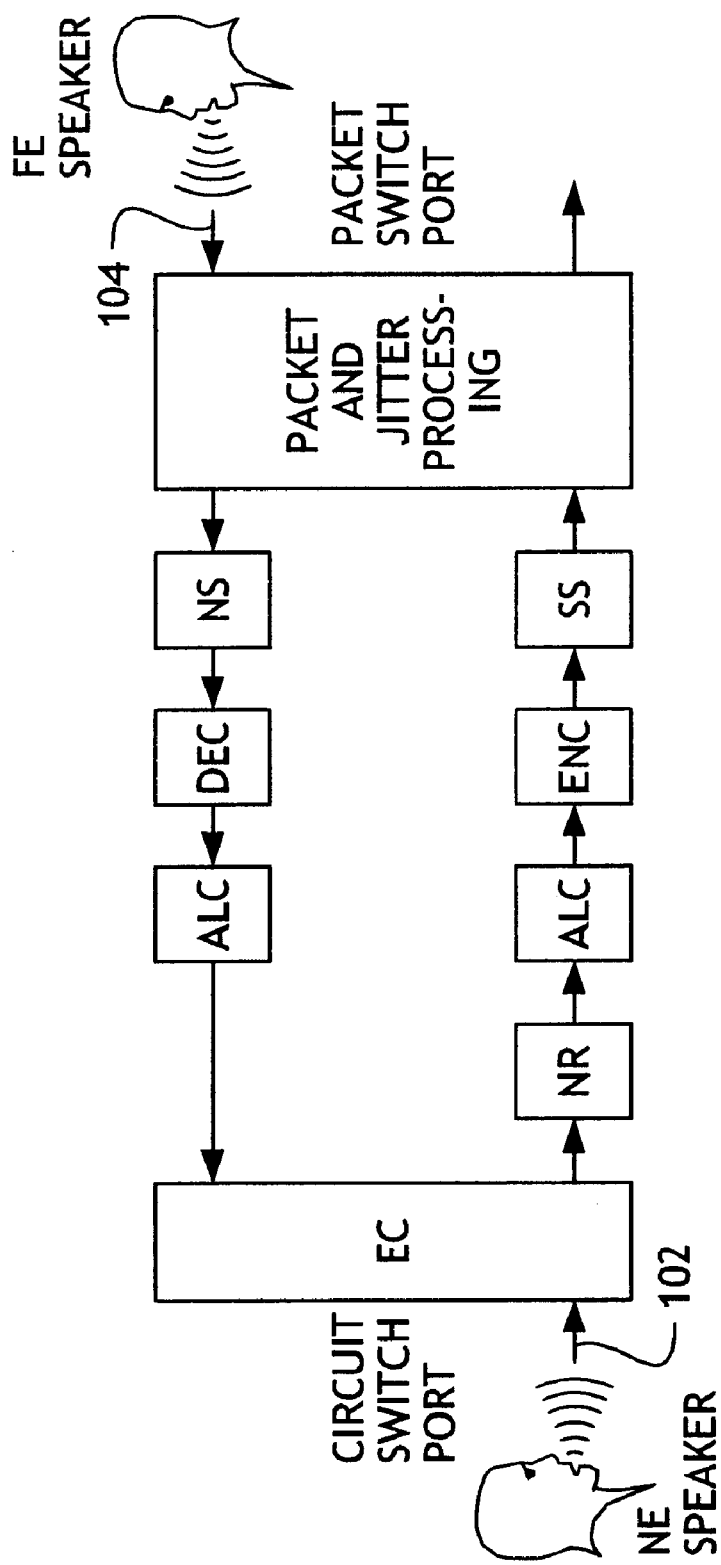
FIG. 1 is block diagram of a voice processing system in accordance with prior art techniques.
Figure 2:
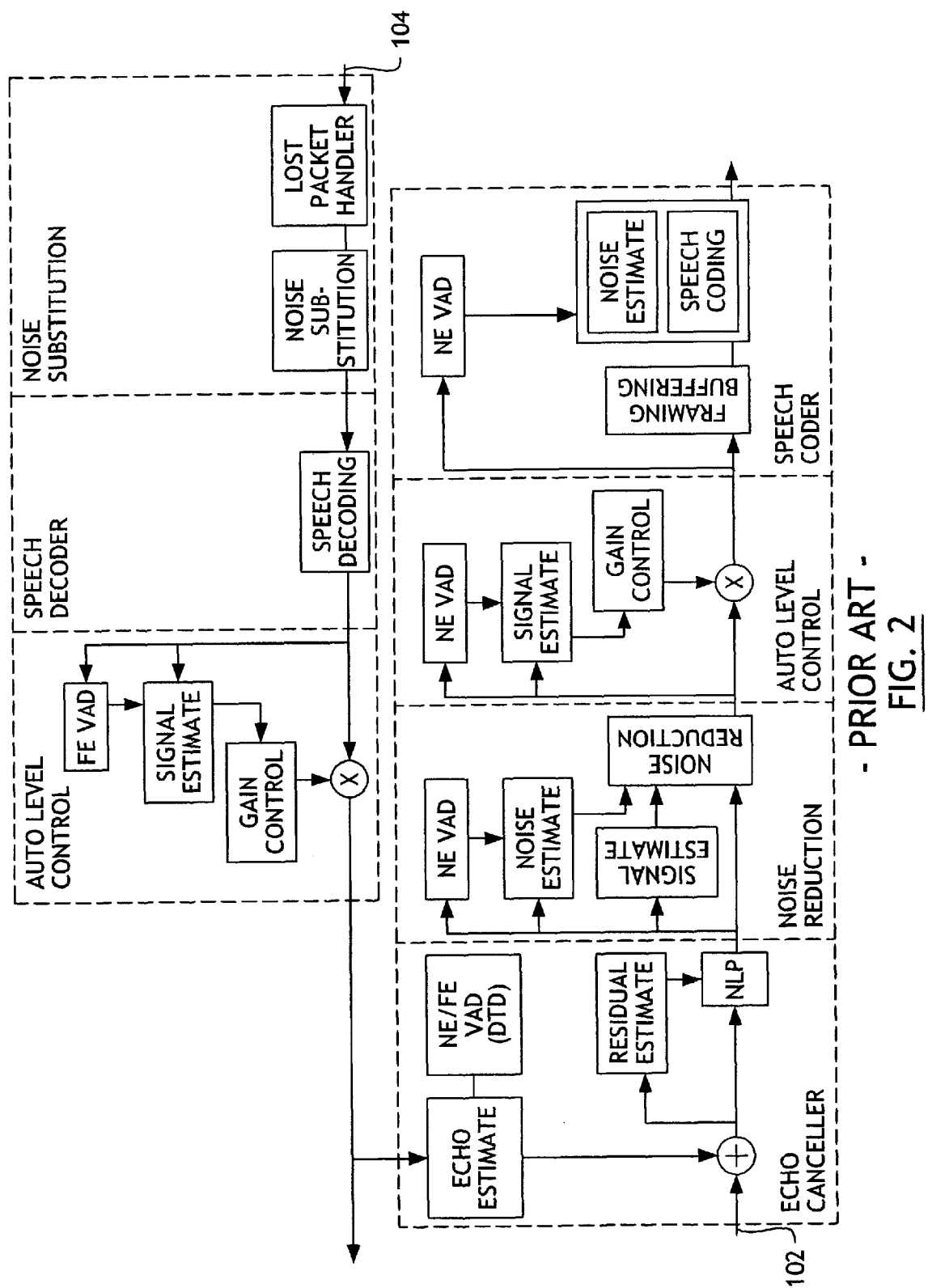
FIG. 2 is a block diagram illustrating various blocks of the voice processing system of FIG. 1 in greater detail.

Almost all of the blocks in FIG. 2 have some form of Voice Activity Detection (VAD) circuitry built into them. The NR sub-system needs to know when speech is absent so that it can update its estimate of the background noise. NR also needs to know when speech is present so that it can adjust gains and calculate signal powers. The ALC block needs to know when speech is present so that it can get a good reading of the voice signal levels. The echo canceller uses a form of VAD called a double talk detector (DTD) to reduce the influence of uncorrelated signals and thus improves its estimate of the echo. The speech encoder and accompanying silence suppressor uses a VAD to detect silence, which triggers a reduction in the rate of transmitted packets (i.e. during silence the codec outputs a description of the silence/background-noise periodically). The integrated approach creates a common VAD that reduces the complexity of the product and in turn, increases density and reduces cost. In addition, the consolidated VAD performs more accurately than the individual VADs.

Higher performance is the result of several factors. First, interaction problems that can occur when multiple voice activity detectors (VAD) are used can be avoided. Each block increases the likelihood that the subsequent blocks' VADs will misinterpret speech as silence or silence as speech. Additionally, the problem of cascading errors is avoided. Certain problem cases can cause a single block to perform incorrectly on a segment of speech or silence. In the multiple VAD case, this can have a cascading effect as the subsequent blocks' VADs trigger errantly.

The goal of the VAD is to accurately detect the presence of either NE or FE speech. If speech is present, then the associated processing of the ALC, NR, or speech coder is performed. The echo canceller's double talk detector (DTD) is another form of VAD. It must detect both NE and FE speech and control the canceller so that it only adapts when NE speech is absent. Interaction between the elements such as the NLP, NR, or changes in the ALC can negatively affect the accuracy of the downstream VAD. For example, losses in the NLP, NR, or ALC subsystems may falsely trigger the speech encoder to misinterpret voice as silence. This would cause the codec to clip the NE speech, which would degrade voice quality. Similarly losses in the NLP or NR subsystems could cause the VAD in the ALC block to perform errantly. Of course the loss in the NLP could likewise cause the NR subsystem to perform incorrectly, thereby suppressing voice. This problem would then cascade into all subsequent blocks. These problems are further accentuated by the various hold-over or hangover counters and the increased number of possible voice activity states in more sophisticated NR systems. A NR system can be established that uses a probability of speech presence measure to control the algorithm instead of a simple threshold.

A second factor in the VAD's performance enhancement is that it uses metrics from several of the blocks that would otherwise only be visible to a single block. The consolidated VAD (CVAD) uses performance measures from the echo canceller block such as Echo Return Loss Enhancement (ERLE), along with typical VAD measures (e.g. RMS power and zero-crossings) for both transmit and receive voice signals. The CVAD also uses the spectral properties and formant information from the noise reduction algorithm and speech encoder. The other speech encoder parameters are also used to help determine voice activity. The encoder's pitch predictor provides a powerful indicator of the presence of voiced speech and is used to further improve the CVAD. Those having ordinary skill in the art are familiar with these metrics and their use in implementing VADs.

A third factor in the CVAD performance enhancement is that it controls all of the hold-over and voice states for each of the subsystems. A hold-over function is commonly added to a VAD to improve the system's performance for unvoiced speech by preventing state changes until a predetermined period of time has expired. The use of multiple voice states is a VAD enhancement that is part of a proprietary adaptive noise cancellation (ANC) algorithm of Tellabs, which is used for noise reduction. Centralizing the control of these interacting enhancement functions prevents unstable interblock interaction. Hence, with the CVAD, both of these VAD enhancements can be optimized for each subsystem without having a detrimental effect on other sub-systems.

Similarly, the speech presence sensitivity requirements of each block differ. For instance, if given a choice between having the speech coder not recognize silence or performing silence suppression procedures during low-level speech, the former would be the obvious choice. Thus, the speech coder requires high speech sensitivity. Some of the other functions such as EC and NR can generally accommodate a less sensitive VAD, and benefit from a multi-level speech probability measure. For instance, the EC can slow the adaptation of its taps as the probability of speech presence measure approaches the DTD threshold. And as previously mentioned, a NR system can be established that uses a probability of speech presence measure to control the algorithm instead of a simple threshold.

In order to accommodate the different speech presence sensitivity requirements, the CVAD provides appropriate voice activity signals to the different blocks; although, the VAD processing is integrated. For instance, the CVAD would normally provide just a binary speech present or absent signal to the speech coder, while a multi-level or probability of speech presence measure is provided to the other blocks. These three CVAD factors combine to create high performance VAD, which produces a powerful improvement in overall system performance.

3. Integrating EC and NR Functions

The interaction between self-optimized processing blocks can result in sub-optimal overall performance. This can be particularly pronounced for the EC function's NLP and the noise reduction function. This is particularly poor when ERLE is poor, which is the case when the NLP is used without the EC. The result is an intermittent choppiness in the speech and background noise.

By integrating the EC and NR functions together a significantly improved system is created. Integrating these two functions facilitates a reordering of the NLP and the NR subsystems. In the NGVPS, the NR subsystem is placed between the EC and the EC's NLP. This is important to speech quality, as the nonlinear nature of the NLP affects the NR system in a dramatic way. When the NLP is placed before the NR function, the NLP can change the noise location and affect its level at various frequencies in a time varying fashion that is difficult to track in the NR system. This is because most of the NR system's noise estimates are performed during silence, but used during speech. This makes NR systems susceptible to time varying noise backgrounds, particularly with regard to spectral content.

Additionally, the NLP with its associated noise injection process may have different background noise levels when speech is present compared to when speech is absent. This is effectively a time varying noise source, which would degrade NR performance in a typical voice processing system (VPS).

The integrated system places the NR function between the EC and the NLP. It also uses a central noise and signal estimate as described in Section 4. The estimates are adjusted to compensate for the effect of the NR system in the control of the NLP. The NR system reduces noise by a fixed factor during times of voice inactivity.

It has been shown that improved NLP performance is realized when the NLP operates in the sub-band domain. However, sub-band NLPs are rarely used due to the cost of creating the sub-band signal, both in real dollars as well as processing power and delay. However, the NGVPS offers this sub-band option, by further integrating the NLP into each of the NR systems sub-bands. These sub-bands are created as part of the noise reduction function. Hence, by integrating these two functions together, performance can be gained without the added cost. The sub-band NLP further improves performance. The integrated EC and NR approach out-performs the black-box approach even without this further enhancement.

In one arrangement, the voice processing blocks include an echo canceller, noise reduction block and level adjustment block. Each of those blocks makes a gain adjustment to the input signal. Normally this is done by each block independently. A preferred implementation involves computing the adjustments individually in each block but then adjusting the signal once per the combined adjustment calculations in one central adjustment block, function or location.

4. Centralized Noise and Signal Estimates

Contrast once again the block diagram of an integrated voice-over-x DSP system as shown in FIG. 3 with the system shown in FIG. 2. The multiple signal estimators of FIG. 2 have been consolidated into a single signal estimator in the control block. Likewise, the multiple noise estimators of FIG. 2 have been consolidated into a single noise estimator in the control block.

The signal estimator is very closely related to some parts of the consolidated VAD (CVAD) function and should perhaps be shown as part of the VAD. This consolidated signal estimator includes both broadband and sub-band signal estimates. The majority of the processing power associated with creating the sub-band estimates is actually part of the NR process. Similarly, the majority of the processing power for the broadband estimate can be considered to be part of an ordinary VAD. These calculations can now be shared by the new high performance CVAD as well as the NR and ALC subsystems.

The various background noise estimates are consolidated into a single background noise estimate. This background noise estimate is actually a set of estimates, some broadband and some sub-band, but is referred to in singular to avoid confusion with the unconsolidated estimates. This estimate is derived from the transmit signal just after the near-end echo estimate is subtracted by the canceller. The consolidated noise estimate serves as the background noise estimate to the NLP subsystem for background noise transparency (also known as comfort noise injection), the NR subsystem (for spectral subtraction of background noise), and the speech encoder (to send silence descriptors during silence). It is also shared by the VAD to help it avoid false triggers resulting from noise and to more accurately calculate the probability of speech being present. Using the signal out of the echo subtraction block improves the quality of this noise estimate, as the estimate is taken before performing other processing, which would corrupt the estimate. This improves the quality of the entire system. For example, the improved background noise estimate can be used in the NR, which, in turn, increases the amount of noise reduction and reduces any artifacts or distortion in the speech. Distorted speech is even more difficult to model in the codec, so it, in turn, would add more distortion. The silence suppressor uses a version of the noise estimate, which has been modified to account for the effect of the NR system. This improves the accuracy of the silence suppressor and reduces the noise modulation.

The quality of the noise often distinguishes one VBE system from the next. On average, speech is active less than 50% of the time, in a given direction.

5. Consolidated Noise Injection

In telephony digital PCM systems, the analog signal is sampled 8000 times per second and converted to an 8 bit digital a-law or $\mu$-law encoded signal. Voice Processing Systems interface with this PCM encoded digital data stream. An echo canceller is one such device that adapts to the impulse response of the near-end transmission facility and produces an echo estimate by multiplying this impulse response by the signal from the far end. This echo estimate is subtracted from the near-end signal producing a signal which has the echo component removed. This process is not exact because of the quantization distortion of the a-law and $\mu$-law encoding processes. This quantization distortion limits the echo return loss enhancement (ERLE) to approximately 33 dB even if all other processes are perfect. This still leaves a residual echo signal that is perceptible to the far-end talker. Historically, this problem is solved within the echo canceller design by passing the signal through a non-linear processor (NLP). The function of the NLP is to remove or attenuate the residual echo component of the signal so that it is no longer perceptible to the far-end talker.

One issue with the use of NLPs is apparent where high non-linearity (from acoustic echo) and background noise is present. When the far end user speaks, their voice energy drives the NLP to operate thereby removing the residual echo. At the same time however the far end user also hears the background noise muting, an effect known as background noise modulation. This is particularly obnoxious to the far end speaker if there is a perceptible delay between the far-end and near-end telephones, since this modulation effect is not covered up by the sidetone applied to his own earpiece.

Historically, one solution to enhancing "background transparency" is to add "comfort noise" that matches the level of the idle channel noise when the center clipper is active. One approach for accomplishing this is described in U.S. Pat. No. 5,157,653 issued in the name of Roland Genter, the teachings of which are hereby incorporated by this reference. This works in most instances, causing this noise modulation effect to be essentially non-perceptible to the far-end listener. The key, however, is the close spectral matching of the comfort noise to the idle channel noise, which requires additional processing power in any system.

The present invention contemplates how another aspect of a voice processing system, such as the noise reduction system element as a specific example, can be used during it's otherwise "idle" time to provide virtually non-perceptible insertion of a derived noise signal into the gaps created during NLP operation.

While it may be possible to design an NLP to remove significant non-linear "echo" artefacts (as may be found in the tail circuit of a mobile cellular telephony network, for example) without disturbing the background noise, it is considered that the processing power required to effectively achieve such puts this solution out of the reach of a practical system. The present invention limits or altogether circumvents any such onerous requirement by keeping the NLP basic and using otherwise spare processing power.

Figure 4:
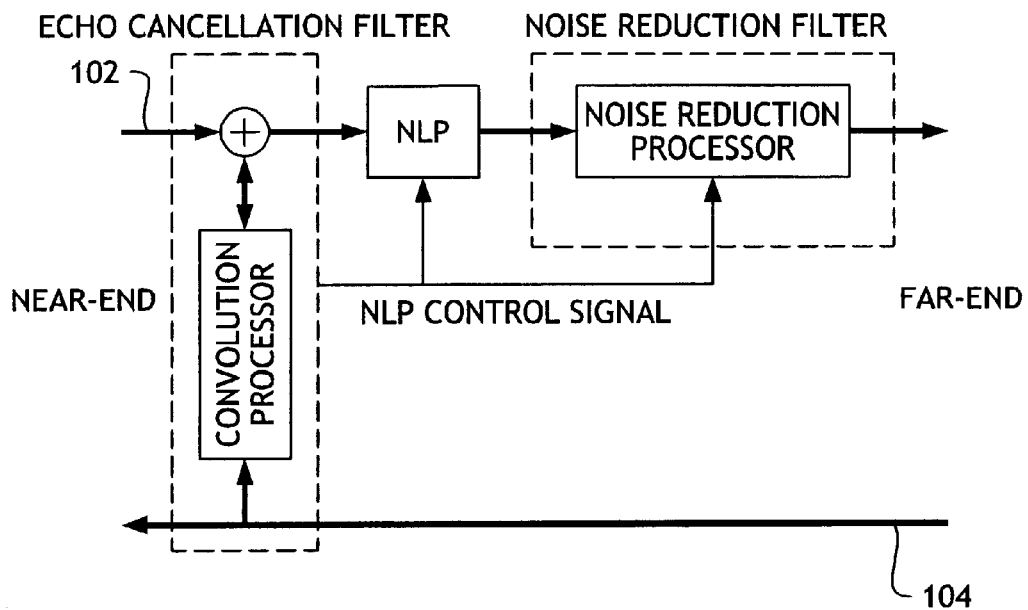
FIG. 4 is a block diagram of an echo canceller and noise reduction circuit in accordance with prior art techniques and to which the present invention may be beneficially applied.

Referring now to FIG. 4, there is illustrated an exemplary echo canceller (EC) and noise reduction (NR) system in accordance with prior art techniques to which the present invention may be applied as described below. In general, operation of the echo canceller filter, the NLP, and the noise reduction filter are well published and known to those of ordinary skill in the art, and therefore need not be described in substantial detail herein. Accordingly, the focus of the following discussion will be on the technique by which system elements and/or characteristics and/or resources, such as for example the readily accessible noise reduction processing aspect of the system, can be used to provide a dynamic spectrally and amplitude matched comfort noise injection signal for insertion into the gaps of signal created by the NLP in response to far-end speech.

During a telephone call the NLP will be operating when the far-end talker speaks (to prevent residual echo), and releasing when the near-end talker speaks. During double-talk, speech is passing in both directions and the NLP is released, but the residual echo remaining after the echo canceller filter is likely to be below a disturbing level. In consideration of the near-end speech scenario, during this time the noise reduction processor will be converging on the stationary content of the background noise, this being the part of a noise signal for which the amplitude and spectrum remain constant over some seconds.

In the next instance the far-end talker will respond to the near-end talker and the echo canceller filter algorithm decides whether the NLP should be operated or not (low to medium near-end noise, or high near-end noise condition respectively). If the NLP is operated then the residual echo and any near-end noise will be muted, giving rise to a background noise modulation effect perceived by the far-end. In an alternate (and for claim construction, an equivalent) embodiment, in other NLP operations, residual echo and any near-end noise might be compressed, scrambled, or compressed and scrambled, or clipped or passed through unprocessed. From experience, perception of the modulation effect by the far-end user is increased if delay over the telephone circuit is increased (>40 mS round trip delay). The overall effect is quite disturbing. Background noise modulation can be an issue wherever the speech path is interrupted, which is why the techniques described herein are equally useful in systems employing discontinuous transmission (DTX) methods and voice activity detectors (VAD).

Many voice-processing systems use a fixed spectrum noise injection system, which is quite suitable for wireline systems where the requirement is to match to random circuit noise ("white" noise), which is of equal amplitude per frequency over the channel bandwidth. A problem occurs however, because in nature the spectrum of acoustically derived background noise does not correspond to random noise, but is produced by music, background from traffic, car noise, or crowd noise (e.g., noise heard over a pay telephone in a restaurant). In many cases, the comfort noise injection is more obnoxious than having no noise injection.

The desirable approach is to sample the noise during the speech gaps and derive a noise model of the stationary element for both amplitude and spectrum; in other words, a model comprising spectral and gain estimates. As known in the art, these estimates may be determined on a broadband or sub-band basis. By deriving the stationary element, a sample of random, spectrally and amplitude matched noise is available to use, less the non-stationary elements that could cause a repeatable pattern during playback into the signal path. The derived noise model can then be seamlessly (substantially unnoticed in the resultant audio) injected into the signal path following the NLP, whilst the NLP is operated. The level of the noise injection may be partially based upon NLP parameters to accommodate various levels of muting or scrambling that might be taking place. Therefore the control for sampling the noise and injecting the noise is common to the NLP control line (not known in prior art systems) from the echo canceller filter shown in FIG. 4. For purposes of claim construction, the term "injecting" refers to (means) substituting a noise signal for an NLP output, as well as combining a noise signal with the NLP output.

Techniques for deriving the noise spectrum and amplitude generally appear in other system designs, however among the differences between such other designs and the approach taken in the context of the herein-described embodiment of the present invention is that the system described herein makes alternative use of at least one aspect of a voice processor system. In particular and in the context of the above-described and -illustrated EC and NR system, resources associated with the noise reduction processor and system are used, during what is effectively an idle period for traditional noise reduction processors (e.g., when the NLP is operated), in a manner to improve the perceived quality of the communicated signal.

Referring back to FIG. 4, ordinarily when there is a signal from the near-end, the noise reduction processor will be converging on the stationary element of the noise signal and then applying a filter function to remove a defined amount of the stationary noise from the signal. When the NLP is operated (to remove residual echo and background noise) the noise reduction filter is "frozen," or in other words not updated or otherwise changed, so that the model is not lost while the NLP is in operation. The noise reduction filter does not ordinarily function to provide noise reduction during this period of NLP operation, but then resumes operation once the NLP is no longer operated. In this way as the noise spectrum and amplitude change throughout the filter processor can track the changes and efficiently reduce the noise.

In the context of the present invention, the spectral and gain estimates maintained by the noise reduction filter, which are typically frozen as described above, are referenced and used in a new manner for the generation of a noise signal for injection into the communication signal at the appropriate intervals (e.g., during operation of the NLP). One example approach for using such filter coefficients in this manner to generate a noise signal for injection is to use them to filter white noise that is internally generated. This noise could be broadband noise that is then filtered by each sub-band weighting coefficient or independent per each sub-band also weighted by each sub-band coefficient. In either case, the generated noise then has the same spectral characteristics as the true or actual background noise since the adaptive sub-band weighting coefficients converge to the spectral coefficients of that noise. By using the gain estimate (s) to scale the spectrally matched noise, the model is able to more accurately match the background noise.

Figure 5:
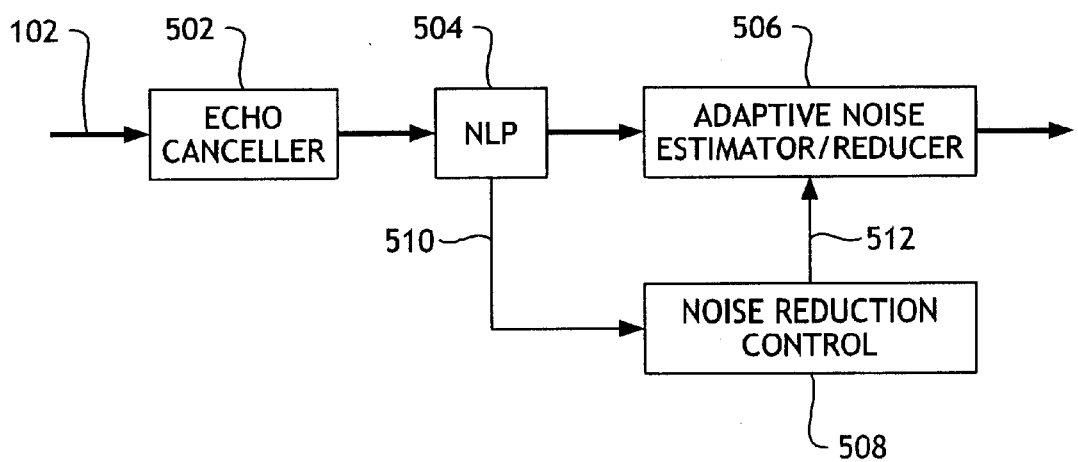
FIG. 5 is a block diagram of a noise injection system in accordance with one embodiment of the present invention.

In this way, at appropriate points during the conversation the noise reduction system effectively contributes to noise generation, but not at the same time that the noise reduction filter is operating to provide typical noise reduction. An example embodiment of this aspect of the present invention is illustrated in FIG. 5. In particular, a transmitted voice signal is provided to an echo canceller 502 and non-linear processor 504. The resulting signal is then sent to an adaptive noise estimator/reducer 506. Additionally, a control signal 510 indicative of the active/inactive state of the NLP 504 is sent to a noise reduction controller 508. In turn, the noise reduction controller 508 provides a noise reduction control signal 512 to the adaptive noise estimator/reducer 506. Thus, if the NLP 502 is inactive, the controller 508 configures the noise reduction control signal 512 to instruct the adaptive noise estimator/reducer 506 to allow the noise estimator to adapt and subtract a portion of the noise from the input voice signal. Conversely, if the NLP 502 is active, the controller 508 configures the noise reduction control signal 512 to instruct the adaptive noise estimator/reducer 506 to freeze the noise estimation process and generate synthesized background noise based on the current frozen background noise model. The synthesized noise is thereafter added to the input signal.

Tests have shown the resulting noise insertion system to have a good match in subjective listening tests and imperceptible operation in conversational tests for a wide range of program material. Even when there is a high content of non-stationary noise in the background noise, the loss of this detail in the returned signal to the far-end user is not considered disturbing since they are talking at this time and sensitivity to non-stationary noise is reduced. It is certainly the case that the far-end talker perceives disturbance in the stationary content greatest and the present invention can be used to resolve this issue.

This same centralized system is used by the codec for its background noise estimate, which is used to generate its SID (silence description) packets when DTX (discontinuous transmission) or multi-rate transmission is active. The noise estimate used by the codec is able to take into account NR, NLP, and noise injection levels and the noise spectrums. These make DTX as unobtrusive as possible.

6. System Awareness and Optimization for Codec Frames and Packetization

Current voice processing systems (VPSs) synchronize the packetization engine to the speech frames generated by codecs. This provides a natural packetization while reusing the same buffering and signal delay for both purposes. This has been accomplished without breaking the black-box approach to building a system, because the frame output of the codec is simply incorporated into the packets.

Another way in which the integration of the NGVPS outperforms current generation of VPSs is by synchronizing the entire system to fixed boundaries, preferably, the codec frames, sub-frames or both. Referring again to FIG. 3, this is accomplished by the framing control block 340 issuing at least one boundary control signal to the respective voice processing blocks, which control signal informs the blocks of the boundaries. This provides enhanced performance for a number of blocks. The ALC, NR, and EC functions of the NGVPS are all enhanced.

ALC is used to add gain to low-level voice signals when too much transmission loss is encountered or to reduce high-level speech signals, which may overdrive analog circuits at the other end of the network. The intelligent block-to-block control coordinates the interaction of the automatic gain control and the speech coder. Gain control changes are synchronized with the frame boundaries of the speech coder. This allows the NGVPS to hold the gain constant during the speech coder sub-frames and/or frames. By not changing the gain during sub-frames and/or frames coder performance is enhanced. Reducing the variation of the signal level mid-frame improves the modeling of the speech by the encoder. Mid-frame level changes require a trade-off in the coder's non-gain speech parameters. The codebook search, for example, needs to select an excitation vector, which when played out through the filter based on the LPC coefficients would have a sudden increase in volume. This does not fit the normal speech model very well and can dominate the selection of a codebook vector causing the more subtle characteristics to be overlooked. Depending on the particular coder, each frame and/or sub-frame of the coded speech contains a gain parameter. By synchronizing the ALC gain changes to these boundaries, the changes can be modeled in the gain parameter without the degenerating effect on the selection of the other parameters.

The ALC algorithm is not only synchronized to the frames in order to coordinate its gain adjustment times, but also to take advantage of the data-blocking required for the codecs. An important part of an ALC system is the ability to minimize clipping due to over-amplification. By synchronizing the ALC system to the data-blocks, the ALC system can look at the entire block for clipping, and incorporate that into its gain selection.

This same type of look-ahead is used to improve the VAD's performance. It is often difficult to recognize changes in voice activity until some time after they happen. By adding look-ahead to a VAD its performance can be improved. Some codecs such as G.729 and G.723.1 require look-ahead data to perform their functions. Again by coordinating the data-blocks with the VAD function, the system VAD can use look-ahead without adding delay to the system.

Many families of noise reduction algorithms, such as the NR algorithm currently being sold by Tellabs, operate on blocks of data at a time. The blocking up of data adds delay to these systems. Unfortunately, these systems are typically used in highly delay-sensitive applications. The NR algorithms are typically fast Fourier transform (FFT) based and require significant buffering. Wavelet-based algorithms and those requiring look-ahead would also require buffers of data and have similar delay implications. The NGVPS eliminates the additional buffering delay required in other systems by using the same data-blocking delays associated with the codecs to perform noise reduction. The current black-box systems do not have this level of synchronization between elements.

The system-wide awareness of the codec frame is also used to improve the operation of the EC. This will be explained in the next section along with the other features of the NGVPS EC. This along with various other EC improvements are included as part of Section 7.

7. Network Adaptive Advanced Echo Canceller with Codec Integration

Figure 6:
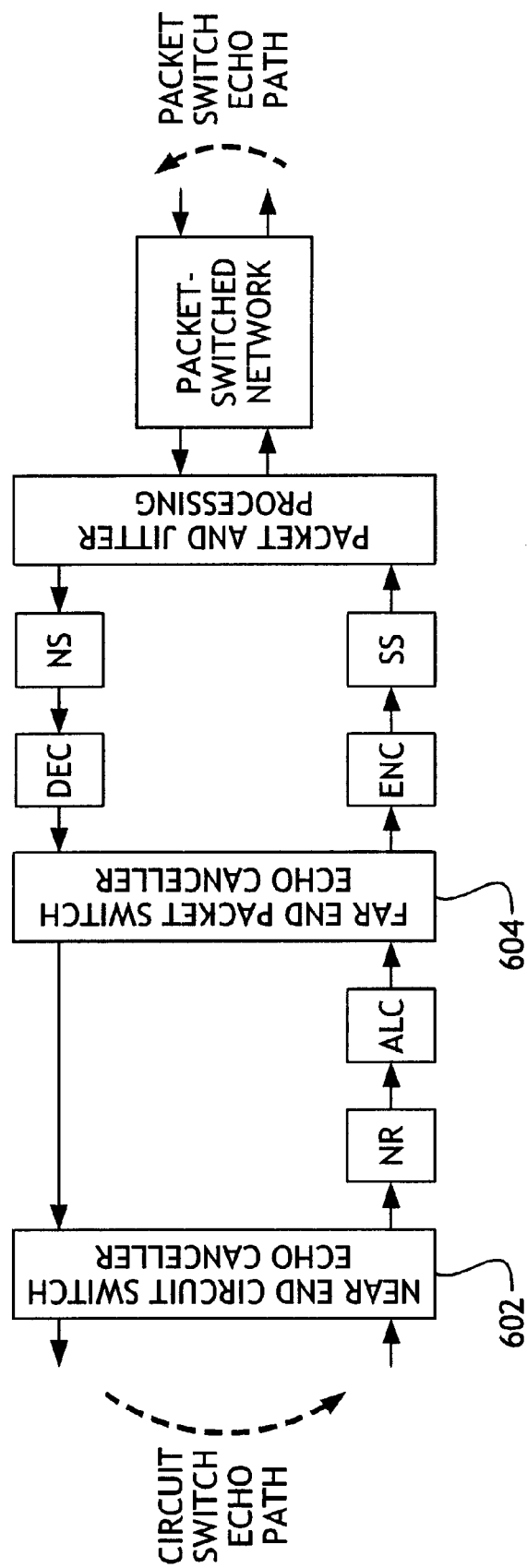
FIG. 6 is a block diagram of a duo echo canceller system in accordance with another embodiment of the present invention.

Another feature of the present invention that can significantly enhance voice quality is the inclusion of a far end echo canceller. Some of today's TDM carriers choose to cancel echo in both directions using a single network element. These "duo" echo cancellers are most popular in wireless environments, where delay introduced in the wireless air interface creates the need to cancel echo in both directions; i.e. echo from the PSTN and wireless terminal. In a packet voice network, an operator may similarly choose to deploy a duo canceller configuration, as the same condition exists. (Note that the term "packet network", as used throughout this disclosure, is a specific example of a wider class of variable delay networks to which the present invention is applicable.) The packet network with speech compression adds delay to connections that might otherwise not need a canceller, as in wireless applications. FIG. 6 shows the duo layout comprising a near end echo canceller 602 and a far end echo canceller 604. Notice that the far end or packet switch echo canceller has the packet network in its endpath. Packet networks are notorious for dropped packets and significant delay variation. Both of these impairments can severely affect the performance of a canceller. In a standard voice-over-x implementation, the packet processor has some knowledge of the lost packets and changes in endpath delay. By sharing this information with the far end echo canceller and by subsequently using this information to intelligently control the canceller's behavior, the detrimental effects created by the packet network are minimized. In other words, voice quality is optimized. Some advanced TDM networks being created for the wireless world may also have changing endpath delay.

This advanced echo canceller (AEC) has a couple of new features. First, it is synchronized to packet boundaries and can disable both coefficient update and echo cancellation on a packet by packet basis. When a packet is lost and has to be replaced using lost or errored packet substitution, the coefficients are frozen and echo cancellation is disabled. If echo cancellation were not disabled, subtracting out the estimated echo response would actually add echo. This would result because the substituted packet would be so different from the lost packet that subtracting the actual echo would effectively be adding the negative of the echo to this signal.

In a more advanced version, the packet substitution algorithm does not base the replacement packet on the previously received packets, but on the echo cancelled versions of these packets.

Another feature of this AEC is that it is integrated with a decoder that receives the same silence description (SID) information sent to the far-end. This enables the near end EC to construct the signal being generated at the far-end. Normally, the SID packets only contain spectral information, which the far end uses to filter randomly chosen excitation vectors. As a result, the accuracy of the reconstructed signal at the far end is limited to the spectral characteristics conveyed by the SID information. However, when the far-end codec is part of the end-to-end system, as with the present invention, it is possible to synchronize the local random codebook excitation selection with that being used at the far-end. Such synchronization may take advantage of any unused bits in the SID packets, which are usually the same size as the regular speech packets but only contain spectral information. The unused bits corresponding to the codebook excitation are available for random number generator synchronization between the two ends. This allows the AEC to have access to the signal that is echoing back, even when DTX is active and comfort noise generation is taking place at the far-end in response to SID packets. Without this feature, the EC would not know what signal was being echoed back and would have to disable coefficient updates. A secondary issue with not having this feature is that any echoed noise would have to be left in the received signal. Preferably, this decoder is active even for non-SID packets. This helps to reduce the nonlinearity of the endpath by modeling the effect of the coder-decoder combination in one direction.

A last feature of the AEC is the ability for the echo cancellers at either end to move their respective h vectors (i.e., time domain transfer function) in response to changes in delay in their respective endpaths. As known in the art, such h vectors model the delay characteristics giving rise to echo conditions. In this regard, each end of the AEC maintains jitter buffers, which adjust in response to network conditions. At the end local to a given EC, the EC receives information from its local jitter buffer and moves the effective locations of the h vector's coefficients in response to the buffer adjustments. Additionally, or alternatively, the EC also monitors its ERLE metric. If the ERLE degrades past one or more thresholds, the EC knows to adjust its h vector's coefficient locations; if the delay has changed the AEC adjusts the h vector's coefficient locations accordingly. In this way the AEC can accommodate delay changes that occur and are not under the NGVPS's control. These types of delay changes can occur due to adjustments in other network buffers. Furthermore, information regarding changes to delay characteristics determined at one end can be forwarded to the other end so that the effects of the changed delay can be accounted for at both ends. For example, if the far end detects a change in delay characteristics having an effect on an echo path manifested at the near end, the far end can send information regarding the change in delay to the near end so that it can begin to adjust its coefficients in anticipation of receiving the audio impacted by the change delay.

These features are also applicable to certain TDM networks, particularly those in the wireless world where speech compression and DTX can create many of the same problems, which the AEC addresses for packet network applications.

While the foregoing detailed description sets forth presently preferred embodiments of the invention, it will be understood that many variations may be made to the embodiments disclosed herein without departing from the true spirit and scope of the invention. This true spirit and scope of the present invention is defined by the appended claims, to be interpreted in light of the foregoing specifications.

What is claimed is:

1. In a communication system comprising a centralized voice activity detector (CVAD) and a plurality of voice processing blocks, coupled thereto, used to process at least one voice signal, a method for controlling operation of the plurality of voice processing blocks, the method comprising steps of:

performing, by the centralized voice activity detector, a first type of voice activity analysis on a transmitted voice signal of the at least one voice signal; and providing, by the centralized voice activity detector, at least one voice activity indication to the plurality of voice processing blocks in response to the first type of voice activity analysis, wherein operation of each of the plurality of voice processing blocks on the transmitted voice signal is dependent upon the at least one voice activity indication.

2. The method of claim 1, wherein the plurality of voice processing blocks comprises any combination of: a noise reduction circuit, an automatic level control circuit, an echo canceller, and a speech encoder.

3. The method of claim 1, wherein the at least one voice activity indication comprises at least two voice activity indications, and wherein the at least two voice activity indications are based on uniquely corresponding, non-identical voice activity thresholds.

4. The method of claim 3, wherein one of the at least two voice activity indications comprises a binary indication.

5. The method of claim 3, wherein one of the at least two voice activity indications comprises a probabilistic indication.

6. The method of claim 1, wherein the step of providing the at least one voice activity indication further comprises providing each of the at least one voice activity indication to a subset of the plurality of voice processing blocks.

7. The method of claim 1, wherein the step of performing further comprises performing a second type of voice processing analysis on a received voice signal of the at least one voice signal, and wherein the step of providing the at least one voice activity indication further comprises providing the at least one voice activity indication only in response to the second type of voice activity analysis.

8. The method of claim 7, wherein the step of providing the at least one voice activity indication further comprises providing the at least one voice activity indication in response to the first and the second type of voice activity analysis.

9. The method of claim 1, further comprising steps of:
performing, by a centralized noise estimator coupled to said CVAD and at least one of the plurality of voice processing blocks, at least one type of noise estimation analysis on the transmitted voice signal; and
providing, by the centralized noise estimator, at least one noise estimate a subset of the plurality of voice processing blocks in response to the at least one type of noise estimation analysis,
wherein operation of each of the subset of the plurality of voice processing blocks on the transmitted voice signal is dependent upon the at least one noise estimate.

10. A computer-readable medium having stored thereon computer-executable instructions for performing the method of claim 1.

11. In a communication system comprising a centralized noise estimator (CNE) and a plurality of voice processing blocks, coupled thereto, used to process a transmitted voice signal, a method for controlling operation of the plurality of voice processing blocks, the method comprising steps of:
performing, by the centralized noise estimator, at least one type of noise estimation analysis on the transmitted voice signal; and
providing, by the centralized noise estimator, at least one noise estimate to the plurality of voice processing blocks in response to the at least one type of noise estimation analysis,
wherein operation of each of the plurality of voice processing blocks on the transmitted voice signal is dependent upon the at least one noise estimate.

12. The method of claim 11, wherein the plurality of voice processing blocks comprises any combination of: a noise reduction circuit, a non-linear processor, a voice activity detector, and a speech encoder.

13. The method of claim 11, wherein the at least one type of noise estimation analysis comprises broadband analysis and sub-band analysis, and wherein the at least one noise estimate comprises a broadband noise estimate based on the broadband analysis and a sub-band noise estimate based on the sub-band analysis.

14. The method of claim 11, wherein the transmitted voice signal is subjected to echo cancellation processing prior to the step of performing the at least one type of noise estimation analysis on the transmitted voice signal.

15. The method of claim 14, wherein the step of performing the at least one type of noise estimation analysis is performed before the transmitted voice signal is subject to non-linear processing.

16. The method of claim 11, further comprising steps of:
performing, by a centralized voice activity detector coupled to said CNE and at least a subset of the plurality of voice processing blocks, voice activity analysis on the transmitted voice signal; and
providing, by the centralized voice activity detector, at least one voice activity indication to the subset of the plurality of voice processing blocks in response to the voice activity analysis,
wherein operation of each of the subset of the plurality of voice processing blocks on the transmitted voice signal is dependent upon the at least one voice activity indication.

17. A computer-readable medium having stored thereon computer-executable instructions for performing the method of claim 11.

18. An apparatus for processing at least one voice signal, comprising:
a plurality of voice processing blocks that each operate upon the at least one voice signal; and
a centralized voice activity detector, coupled to each of the plurality of voice processing blocks, that performs at least one type of voice activity analysis on the at least one voice signal and provides at least one voice activity indication to the plurality of voice processing blocks in response to the at least one type of voice activity analysis,
wherein operation of each of the plurality of voice processing blocks on the at least one voice signal is dependent upon the at least one voice activity indication.

19. The apparatus of claim 18, wherein the plurality of voice processing blocks comprises any combination of: a noise reduction circuit, an automatic level control circuit, an echo canceller, and a speech encoder.

20. The apparatus of claim 18, wherein the at least one voice signal comprises a transmitted voice signal and the centralized voice activity detector performs a first type of voice activity analysis on the transmitted voice signal.

21. The apparatus of claim 20, wherein the at least one voice signal comprises a received voice signal and the centralized voice activity detector performs a second type of voice activity analysis on the received voice signal.

22. The apparatus of claim 18, wherein the at least one voice signal comprises a received voice signal and the centralized voice activity detector performs a second type of voice activity analysis on the received voice signal.

23. The apparatus of claim 18, further comprising a programmable processor coupled to a storage device, wherein the centralized voice activity detector is implemented via instructions executed by the programmable processor and stored in the storage device.

24. The apparatus of claim 18, further comprising:
a centralized noise estimator, coupled to at least a subset of the plurality of voice processing blocks and the centralized voice activity detector, that performs at least one type of noise estimation analysis on the at least one voice signal and provides at least one noise estimate to the subset of the plurality of voice processing blocks in response to the at least one type of noise estimation analysis,
wherein operation of each of the subset of the plurality of voice processing blocks on the at least one voice signal is dependent upon the at least one noise estimate.

25. An apparatus for processing at least one voice signal, comprising:
a plurality of voice processing blocks that each operate upon the at least one voice signal; and
a centralized noise estimator, coupled to each of the plurality of voice processing blocks, that performs at least one type of noise estimation analysis on the at least one voice signal and provides at least one noise estimate to the plurality of voice processing blocks in response to the at least one type of noise estimation analysis, wherein operation of each of the plurality of voice processing blocks on the at least one voice signal is dependent upon the at least one noise estimate.

26. The apparatus of claim 25, wherein the plurality of voice processing blocks comprises any combination of: a noise reduction circuit, a non-linear processor, a voice activity detector, and a speech encoder.

27. The apparatus of claim 25, further comprising a programmable processor coupled to a storage device, wherein the centralized noise estimator is implemented via instructions executed by the programmable processor and stored in the storage device.

28. The apparatus of claim 25, further comprising:

a centralized voice activity detector, coupled to at least a subset of the plurality of voice processing blocks and the centralized noise estimator, that performs at least one type of voice activity analysis on the at least one voice signal and provides at least one voice activity indication to the subset of the plurality of voice processing blocks in response to the at least one type of voice activity analysis, wherein operation of each of the subset of the plurality of voice processing blocks on the at least one voice signal is dependent upon the at least one voice activity indication.

29. In a communication system comprising a centralized signal characteristic estimator and a plurality of voice processing blocks, coupled thereto, used to process a transmitted voice signal, a method for controlling operation of the plurality of voice processing blocks, the method comprising steps of:

performing, by the centralized signal characteristic estimator, at least one type of signal characteristic estimation analysis on the transmitted voice signal; and providing, by the centralized signal characteristic estimator, at least one signal characteristic estimate to the plurality of voice processing blocks in response to the at least one type of noise estimation analysis, wherein operation of each of the plurality of voice processing blocks on the transmitted voice signal is dependent upon the at least one signal characteristic estimate.

30. The method of claim 29, wherein the plurality of voice processing blocks comprises any combination of: a noise reduction circuit, a non-linear processor, a voice activity detector, and a speech encoder.

31. The method of claim 29, wherein the at least one type of signal characteristic estimation analysis comprises broadband analysis and sub-band analysis, and wherein the at least one signal characteristic estimate comprises a broadband signal characteristic estimate based on the broadband an signal characteristic analysis and a sub-band signal characteristic estimate based on the sub-band analysis.

32. The method of claim 29, wherein the transmitted voice signal is subjected to echo cancellation processing prior to the step of performing the at least one type of signal characteristic estimation analysis on the transmitted voice signal.

33. The method of claim 32, wherein the step of performing the at least one type of signal characteristic estimation analysis is performed before the transmitted voice signal is subject to non-linear processing.

34. The method of claim 29, further comprising steps of:

providing a centralized voice activity detector coupled to the centralized signal characteristic estimator and at least a portion of the plurality of voice processing blocks;

performing, by the centralized voice activity detector, voice activity analysis on the transmitted voice signal; and providing, by the centralized voice activity detector, at least one voice activity indication to the portion of the plurality of voice processing blocks in response to the voice activity analysis, wherein operation of each of the portion of the plurality of voice processing blocks on the transmitted voice signal is dependent in part upon the at least one voice activity indication.

35. A computer-readable medium having stored thereon computer-executable instructions for performing the method of claim 29.

36. In a communication system comprising a plurality of voice processing blocks used to process at least one voice signal, a method for centralizing a computation of signal operations of the plurality of voice processing blocks, the method comprising steps of:

computing at least one adjustment signal from a subset of the voice processing blocks;

adjusting a first voice processing block in order to process the at least one voice signal during a segment of speech or silence in response to said step of computing the at least one adjustment signal.

* * * * *